US006766024B1

(12) United States Patent
Rix

(10) Patent No.: US 6,766,024 B1
(45) Date of Patent: Jul. 20, 2004

(54) DATA COMMUNICATION SYSTEM

(75) Inventor: Simon Paul Ashley Rix, Transvaal (ZA)

(73) Assignee: Mindport B.V., HD Hofddorp (NL)

( * ) Notice: Subject to any disclaimer, the term of this patent is extended or adjusted under 35 U.S.C. 154(b) by 0 days.

(21) Appl. No.: 09/386,184

(22) Filed: Aug. 31, 1999

(51) Int. Cl.$^7$ ................................................ H04L 9/34
(52) U.S. Cl. ............................. 380/37; 380/29; 380/43; 380/273
(58) Field of Search ........................... 380/37, 273, 28, 380/29, 43

(56) References Cited

U.S. PATENT DOCUMENTS

| | | | |
|---|---|---|---|
| 4,531,020 A | 7/1985 | Wechselberger et al. . | 178/22.08 |
| 4,868,877 A | 9/1989 | Fischer ......................... | 380/25 |
| 4,887,296 A | 12/1989 | Horne .......................... | 380/21 |
| 5,029,207 A | 7/1991 | Gammie ....................... | 380/10 |
| 5,054,064 A | 10/1991 | Walker et al. .................. | 380/5 |
| 5,159,633 A | 10/1992 | Nakamura .................... | 380/30 |
| 5,237,610 A | 8/1993 | Gammie et al. ............... | 380/10 |
| 5,282,249 A | 1/1994 | Cohen et al. ................. | 380/23 |
| 5,420,866 A | 5/1995 | Wasilewski ............. | 370/110.1 |
| 5,600,378 A | 2/1997 | Wasilewski .................. | 348/468 |
| 5,625,693 A | 4/1997 | Rohatgi et al. ............... | 380/23 |
| 5,742,677 A | 4/1998 | Pinder et al. ................... | 380/4 |
| 5,796,836 A * | 8/1998 | Markham ..................... | 380/28 |
| 5,870,474 A | 2/1999 | Wasilewski et al. .......... | 380/21 |
| 6,061,451 A * | 5/2000 | Muratani et al. ............. | 380/201 |
| 6,333,983 B1 * | 12/2001 | Enichen et al. .............. | 380/273 |
| 6,347,143 B1 * | 2/2002 | Goff et al. ..................... | 380/37 |
| 6,542,607 B1 * | 4/2003 | Euchner et al. ................ | 380/37 |

FOREIGN PATENT DOCUMENTS

| | | | |
|---|---|---|---|
| EP | 0 428 252 A2 | 5/1991 | .......... H04N/7/167 |
| EP | 0 658 054 A2 | 6/1995 | ............ H04N/7/16 |
| EP | 0 689 316 A2 | 12/1995 | ............. H04L/9/32 |
| EP | 0 696 141 A2 | 2/1996 | .......... H04N/7/167 |
| EP | 0 822 720 A1 | 2/1998 | .......... H04N/7/167 |
| WO | WO 97/04553 | 2/1997 | ........... H04L/12/22 |
| WO | WO 97/38530 | 10/1997 | ............ H04N/7/16 |

OTHER PUBLICATIONS

EBU Project Group B/CA, "Functional Model of a Conditional Access System", *EBU Technical Review*, No. 266, pp. 64–77, (Winter 1995).
A copy of European Search Report completed on Jan. 22, 1999 (2 pages).
Francoise Coutrot et al., "A Single Conditional Access System for Satellite–Cable and Terrestrial TV", *IEEE Transactions on Consumer Electronics*, vol. 35, No. 3, pp. 464–468, (Aug. 1989).
Andy Trott, "An Enhanced Cost Effective Line Shuffle Scrambling System with Secure Conditional Access Authorization", *NCTA Technical Papers*, pp. 133–143, (Jun. 6, 1993).

* cited by examiner

*Primary Examiner*—Gilberto Barfon
*Assistant Examiner*—A. Nobahar
(74) *Attorney, Agent, or Firm*—Blakely, Sokoloff, Taylor & Zafman LLP

(57) ABSTRACT

A system for decrypting an encrypted message comprises first and second decryption devices, the first decryption device having a higher security than the second decryption device. The system further comprises means for dividing the encrypted message into blocks, and means for providing at least the first block of the message to the first decryption device and for providing a plurality of further blocks of this message to the second decryption device. An output of the first decryption device is used as input of the second decryption device. The second decryption device operates according to a block chaining method for decrypting the plurality of further blocks.

29 Claims, 1 Drawing Sheet

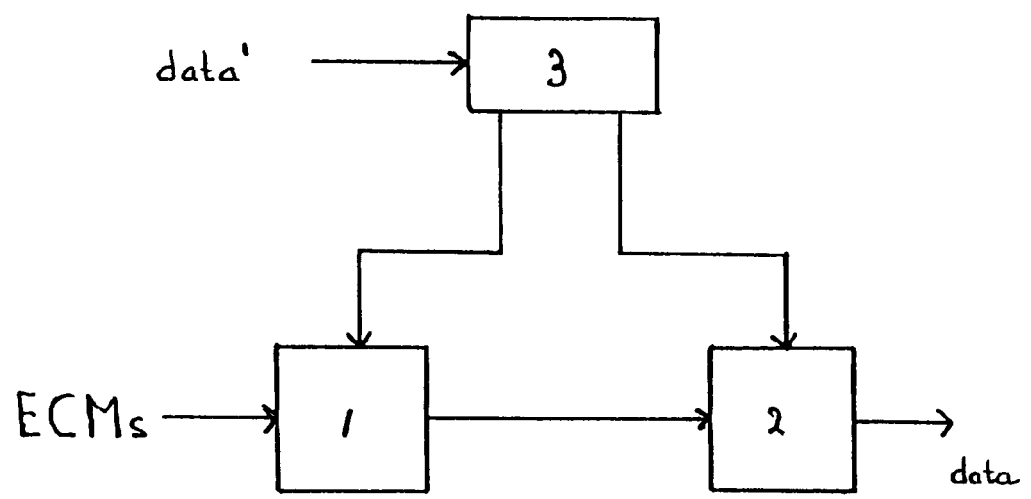

DATA COMMUNICATION SYSTEM

The present patent application claims the priority benefit of the filing date of European Application (EPO) No. 98202916.7 filed Sep. 1, 1998

BACKGROUND OF THE INVENTION

The invention generally relates to a data communication system, and more specifically to a system and method for decrypting an encrypted message and a method for broadcasting data.

Such systems are known in various embodiments and are for example used in a decoder with a conditional access module for pay TV. Generally a secret key is required for decrypting the message, wherein decryption is carried out in a security device in order to prevent unauthorized persons to access the secret key. As security device a smart card can be used, for example. Such a known system using a smart card for decrypting the message shows the disadvantage that the security device has a restricted computing capacity. On the other hand on many locations a computer system with high computing capacity is available, however such systems are easily accessible for unauthorized persons.

The invention aims to provide a system of the above-mentioned type with a combination of high security and high computing capacity.

SUMMARY OF THE INVENTION

To this end the system for decrypting an encrypted message according to the invention comprises first and second decryption devices, the first decryption device having a higher security than the second decryption device, means for dividing the encrypted message into blocks, and means for providing at least the first block of the message to the first decryption device and for providing a plurality of the further blocks of this message to the second decryption device, wherein an output of the first decryption device is used as input of the second decryption device, said second decryption device operating according to a block chaining method for decrypting said plurality of further blocks.

In this manner a system is provided wherein the first decryption device having a higher security is used for decrypting a first block of the message only whereafter the remaining part of the message is decrypted by the second decryption device which can have a high computing capacity. The second decryption device can have a low security as the use of a block chaining method makes the insecure decryption device as secure as the first decryption device.

In order to further enhance security the providing means provides each $x^{th}$ block to the first decryption device according to a further embodiment of the invention. It is noted that the term $x^{th}$ block means that the number of intermediate blocks is not fixed, i.e. may very as desired.

The invention further provides a method for decrypting an encrypted message, comprising the steps of dividing a message into blocks, decrypting at least the first block in a first decryption device, decrypting a plurality of further blocks in a second decryption device, the first decryption device having a higher security than the second decryption device, using an output of the first decryption device as input of the second decryption device and operating the second decryption device according to a block chaining method.

BRIEF DESCRIPTION OF THE DRAWING

The invention will be further explained by reference to the drawing in which an embodiment of the system of the invention is shown in a very schematical manner.

A system for decrypting a message, for example the encrypted payload in a pay TV transport stream, comprises a first decryption device 1 and a second decryption device 2. The first decryption device has a very high security and is made for example as a smart card. In the smart card a secret key is stored for decryption purposes. The second decryption device 2 has a low security and can be a PC or a microprocessor in a conditional access module or the like.

The system further comprises means 3 for dividing a message received into blocks, wherein the means 3 provides at least the first block to the first decryption device 1 and a plurality of the further blocks of the message to the second decryption device 2. The first block is decrypted by the device 1 according to the decryption algorithm used and the clear text output is forwarded to the second decryption device 2. The second decryption device 2 decrypts the further blocks according to an error-propagating block chaining method using the clear text output of the device 1 as initialisation vector. In this manner the insecure device 2 is made as secure as the first device 1.

If desired the means 3 can be arranged in such a manner that each xth block is decrypted by the first decryption device 1.

It is noted that instead of an error-propagating block chaining method another block chaining method can be used, although an error-propagating method is preferred.

Further, the first device could provide a partially decrypted result as output to the second device. In that case the second device would first complete the decryption operation and would then operate according to the block chaining method used.

The system described can advantageously be used in a pay TV system, wherein entitlement control messages ECMs are used to distribute keys to subscribers, which keys are used to scramble the data. Of course, these ECMs are also encrypted, preferably by using another key, for example a group key. According to a prefered embodiment the data to be distributed is divided into blocks as described, wherein the first block and if desired each $x^{th}$ block of data is scrambled using a first key CW1 and wherein the further blocks are scrambled using a second key CW2 in a block chaining method using the first block and if applicable each $x^{th}$ block as input vector. Both keys CW1 and CW2 are distributed by means of the ECMs.

At the subscribers the ECMs are provided to the first decryption device or smart card 1 in a usual manner. The smart card 1 decrypts the ECMs and uses the key CW1 to descramble the first block of data (and each $x^{th}$ block) received from the means 3. The second key CW2 and the first and $x^{th}$ blocks are delivered to the second security device 2, in this case a control access module for example, to descramble the further blocks of data according to the block chaining method used in the system. In this manner it is prevented that the key CW1 which generally contains of 64 bits only, is accessible to unauthorized persons for distribution to other unauthorized persons for descrambling the payload data.

The system and method described are particularly suitable to prevent a form of piracy which is known in the pay TV industry as "hook" piracy. In this type of piracy the key or control word CW which is used to encrypt the data and which has been determined by a pirate, is rebroadcast by the pirate to receivers which already receive the scrambled data. These receivers then use the key to descramble the data, thereby circumventing the conditional access system of the broadcasting organisation. In pay TV environment this form of piracy has never gained wide usage due to the logistical problems of setting up a broadcast network to rebroadcast the key.

However, with increasing usage of the internet also for multicasting of broadcasting data, the terminals receiving the scrambled data from the internet can receive data from virtually any other source on the internet simultaneously. Therefore, it is possible to receive the keys required to decrypt the data from an other source, thereby circumventing the conditional access system. Rebroadcasting the key only requires a few bits per second bandwidth thereby making the conditional access system of the data broadcasters vulnerable.

Although a possible solution to this problem would be to perform the descrambling of the data entirely within the smart card or any other secure device, the ability of a smart card to handle data at high data rates is limited. The current standard bit rate for communicating with a smart card is 9600 bit/s. The real payload throughput is in fact much lower due to overheads on the serial link between the smart card and the conditional access module or the like.

According to the invention the data to be broadcasted is first divided into blocks and then at least the first data block is encrypted using a first secret key and thereafter a plurality of the further data blocks is encrypted according to an error-propagating block chaining method using the first data block as input vector in a high speed scrambler unit. The scrambled data obtained in this manner is broadcasted and can be descrambled or decrypted in the above described manner. Although the pirate could rebroadcast the output of the smart card, i.e. the descrambled first data block the bandwidth required for rebroadcasting by the pirate is effectivily increased to the maximum rate which is possible on the interface between smart card and conditional access module or the like. As stated above, the amount of data required for rebroadcasting is thereby increased to several kilobits per second as opposed to the few bits per second required for key redistribution. With newer smart card technology this can be increased to hundreds of kilobits per second. In this manner rebroadcasting will generally be effectively prevented.

What is claimed is:

1. A system for decrypting an encrypted message, comprising first and second decryption devices, the first decryption device having a higher security than the second decryption device, means for dividing an encrypted message into blocks, and means for providing at least the first block of a message to the first decryption device and for providing a plurality of the further blocks of this message to the second decryption device, where an output of the first decryption device is used as input of the second decryption device, said second decryption device operating according to a block chaining method for decrypting said plurality of further blocks.

2. The system according to claim 1, wherein said providing means provides each $x^{th}$ block to the first decryption device.

3. The system according to claim 1, wherein said second decryption device operates according to an error-propagating block chaining method.

4. The system according to claim 1, wherein the first decryption device provides a clear text output.

5. The system according to claim 1, wherein the first decryption device provides a partially decrypted output, wherein the second decryption device first completes the decryption operation.

6. The system according to claim 1 wherein the computing speed of said second decryption device is higher than the computing speed of the first decryption device.

7. A method for distributing data in a system with a number of receivers, comprising the steps of dividing the data into blocks, encrypting at least the first block using a first key and encrypting a plurality of the further blocks according to a block chaining method using the first block as input vector, wherein a second key is used in the block chaining method to encrypt said plurality of further blocks, distributing the encrypted data to the receivers and distributing the first key in an encrypted message to the receivers.

8. The method according to claim 7, comprising the steps of receiving the encrypted data and the first key at a receiver, dividing the encrypted data into blocks, decrypting at least the first block in a first decryption device using the first key, decrypting a plurality of further blocks in a second decryption device, the first decryption device having a higher security than the second decryption device, using an output of the first decryption device as input to the second decryption device and operating the second decryption device according to said block chaining method.

9. The method according to claim 7, wherein the first and second keys are distributed to the receivers in an encrypted message, the encrypted message being decrypted by the first decryption device, wherein the first decryption device forwards the second key and the first block to the second device.

10. The method according to claim 7, wherein the first and each $x^{th}$ block are encrypted using the first key or decrypted in the first decryption device using the first key, respectively.

11. The system according to claim 2, wherein said second decryption device operates according to an error-propagating block chaining method.

12. The system according to claim 2, wherein the first decryption device provides a clear text output.

13. The system according to claim 3, wherein the first decryption device provides a clear text output.

14. The system according to claim 11, wherein the first decryption device provides a clear text output.

15. The system according to claim 2, wherein the first decryption device provides a partially decrypted output, wherein the second decryption device first completes the decryption operation.

16. The system according to claim 3, wherein the first decryption device provides a partially decrypted output, wherein the second decryption device first completes the decryption operation.

17. The system according to claim 2, wherein the computing speed of said second decryption device is higher than the computing speed of the first decryption device.

18. The system according to claim 3, wherein the computing speed of said second decryption device is higher than the computing speed of the first decryption device.

19. The system according to claim 4, wherein the computing speed of said second decryption device is higher than the computing speed of the first decryption device.

20. The system according to claim 5, wherein the computing speed of said second decryption device is higher than the computing speed of the first decryption device.

21. The system according to claim 11, wherein the computing speed of said second decryption device is higher than the computing speed of the first decryption device.

22. The system according to claim 12, wherein the computing speed of said second decryption device is higher than the computing speed of the first decryption device.

23. The system according to claim 13, wherein the computing speed of said second decryption device is higher than the computing speed of the first decryption device.

24. The system according to claim 14, wherein the computing speed of said second decryption device is higher than the computing speed of the first decryption device.

25. The system according to claim 15, wherein the computing speed of said second decryption device is higher than the computing speed of the first decryption device.

26. The system according to claim 16, wherein the computing speed of said second decryption device is higher than the computing speed of the first decryption device.

27. The method according to claim 8, wherein the first and second keys are distributed to the receivers in an encrypted message, the encrypted message being decrypted by the first decryption device, wherein the first decryption device forwards the second key and the first block to the second device.

28. The method according to claim 8, wherein the first and each $x^{th}$ block are encrypted using the first key or decrypted in the first decryption device using the first key, respectively.

29. The method according to claim 9, wherein the first and each $x^{th}$ block are encrypted using the first key or decrypted in the first decryption device using the first key, respectively.

* * * * *